United States Patent
Sussman

[11] 4,017,159
[45] Apr. 12, 1977

[54] TWO-ELEMENT EYEPIECE
[75] Inventor: Milton H. Sussman, Amherst, N.Y.
[73] Assignee: American Optical Corporation, Southbridge, Mass.
[22] Filed: Feb. 9, 1976
[21] Appl. No.: 656,764
[52] U.S. Cl. .............................. 350/175 E; 350/231
[51] Int. Cl.² .......................................... G02B 9/06
[58] Field of Search ........................ 350/175 E, 231
[56] References Cited
UNITED STATES PATENTS
3,421,807  1/1969  Nothnagle et al. ............ 350/231 X Primary Examiner—Paul A. Sacher
Attorney, Agent, or Firm—Alan H. Spencer; William C. Nealon; H. R. Berkenstock, Jr.

[57] ABSTRACT

A two-element eyepiece having a biconvex singlet with the radii of the convex surfaces being substantially identical and a convex-plano doublet formed of a biconvex element having radii of the convex surfaces being substantially equal with a concavo-plano component cemented thereto, has a field of view of approximately 40° with good correction for normal eyepiece aberrations. Eye relief is approximately 80 percent of the effective focal length.

2 Claims, 1 Drawing Figure

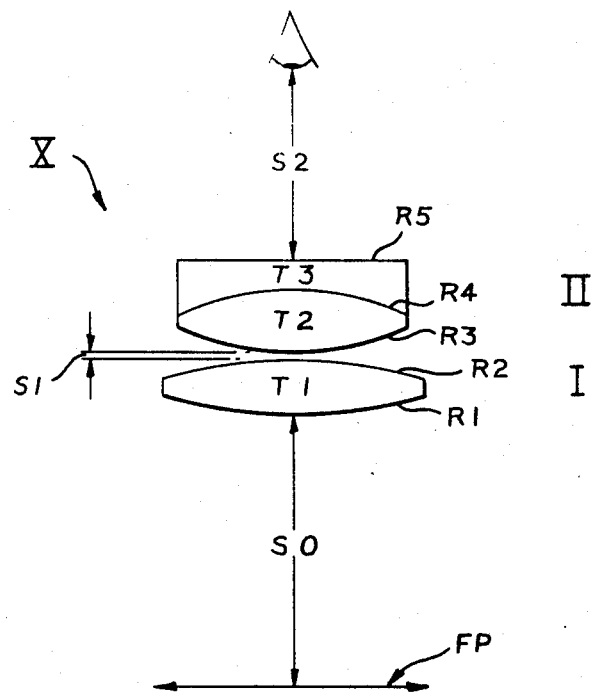

TWO-ELEMENT EYEPIECE

BACKGROUND OF THE INVENTION

This invention relates to microscope eyepieces and more particularly, relates to an eyepiece having a magnification of substantially 10X, an apparent field of view of approximately 40°, eye relief equal to approximately 80 percent of the effective focal length and a minimum number of elements having configurations desirable to minimize production costs is advantageous.

It is an object of this invention to provide 10X eyepieces having elements of a configuration desirable for minimizing production costs.

It is another object of the present invention to provide an inexpensive 10X eyepiece having good correction for the usual eyepiece aberrations of field curvature, distortion and lateral color.

It is still further an object of the present invention to correct pupil aberrations to reduce annoying shadows resulting from slight head movements to a minimum.

THE DRAWING

The drawing is an optic 1 diagram of an eyepiece view transversed to the optical axis.

DETAILED DESCRIPTION OF THE INVENTION

Referring to the drawing, an eyepiece X, is shown diagrammatically with optically-aligned lenses I and II. The first element I is a biconvex positive singlet with radii $R_1$ and $R_2$ being substantially equal, and the second element II is a convex-plano positive doublet. Doublet II consists of a biconvex singlet, having radii $R_3$ and $R_4$ being substantially equal, cemented to a concavo-plano singlet. The eyepiece has an eye relief of approximately 80 percent the effective focal length which is adequate for viewing with or without glasses.

The parameters of an eyepiece according to the present invention are set forth in Table I with the axial thicknesses of successive lens elements designated $T_1$ to $T_3$, the successive axial spaces from the eyepiece focal plane FP to the observer's eye designated $S_0$ to $S_2$, successive lens radii are designated $R_1$ to $R_5$ where a minus sign (−) applies to surfaces whose center of curvature lies on the focal plane side of their vertices, refractice indices of the successive glasses are designated $ND_1$ to $ND_3$ and the Abbe numbers of the successive glasses are designated $\nu_1$ to $\nu_3$.

TABLE I

| Lens | Radius | Thickness | Space | Index of Refraction | Abbe Number |
|---|---|---|---|---|---|
| | | | $S_0$=1.0331x | | |
| I | $R_1$=1.5796x | $T_1$=0.2057x | | 1.52<$ND_1$<1.53 | $\nu_1 \approx 58$ |
| | $R_2$=−1.5796x | | $S_1$=0.02174x | | |
| | $R_3$=1.0626x | | | | |
| II | | $T_2$=0.2341x | | 1.52<$ND_2$<1.53 | $\nu_2 \approx 58$ |
| | $R_4$=−1.0626x | $T_3$=0.1087x | | 1.78<$ND_3$<1.79 | $\nu_3 \approx 25$ |
| | $R_5$=∞ | | $S_2$=0.8609x | | | where x=20 to 26mm

One embodiment of the present invention wherein x has a value of 23.0 has the following values:

Table II

| Lens | Radius | Thickness | Space | Index of Refraction | Abbe Number |
|---|---|---|---|---|---|
| | | | $S_0$=23.761 | | |
| I | $R_1$=36.331 | $T_1$=4.738 | | $ND_1$=1.523 | $\nu_1$=58.6 |
| | $R_2$=−36.331 | | $S_1$=0.5 | | |
| | $R_3$=24.439 | | | | |
| II | | $T_2$=5.384 | | $ND_2$=1.523 | $\nu_2$=58.6 |
| | $R_4$=−24.439 | $T_3$=2.50 | | $ND_3$=1.786 | $\nu_3$=25.5 |
| | $R_5$=∞ | | $S_2$=19.8 | | |

It will be apparent that the foregoing values are variable depending on the value of $x$. Other forms are thus possible and changes may be made in the values of the constructional data named without departing from the spirit of this invention.

The apparent excess precision implied by the large number of decimal places is somewhat fictitious for a number of reasons. For instance, varying radii (larger in particular) by several millimeters would produce only minimal changes, mostly in focal length. Variations in thicknesses of 0.1 to 0.2mm would not adversely affect performance. In fact, large regions of design exist (assuming that radii and thicknesses are properly balanced).

What is claimed is:

1. A two-element eyepiece having a magnification of substantially 10X, a field of view of approximately 40° and eye relief of approximately 80 percent of the effective focal length which comprises a biconvex positive singlet as the first element and a convex-plano positive doublet as the second element, said lens elements having the following values:

| Lens | Radius | Thickness | Space | Refraction | Abbe Number |
|---|---|---|---|---|---|
| | | | $S_0$= | | |

-continued

| Lens | Radius | Thickness | Space | Refraction | Abbe Number |
|---|---|---|---|---|---|
| | | | 1.0331x | | |
| | $R_1=$ 1.5796x | | | | |
| 1 | | $T_1=$ 0.2057x | | $1.52 < N_{D_1} < 1.53$ | $\nu_1 \cong 58$ |
| | $R_2=$ −1.5796x | | $S_1=0.02174x$ | | |
| | $R_3=$ 1.0626x | | | | |
| | | $T_2=$ 0.2341x | | $1.52 < N_{D_2} < 1.53$ | $\nu_2 \cong 58$ |

-continued

| Lens | Radius | Thickness | Space | Refraction | Abbe Number |
|---|---|---|---|---|---|
| II | $R_4=$ −1.0626x | | | | |
| | | $T_3=$ 0.1087x | | $1.78 < N_{D_3} < 1.79$ | $\nu_3 \cong 25$ |
| | $R_5=\infty$ | | $S_2=$ 0.8609x | | | where x=20 to 26mm wherein the minimum amount of surface curvatures and lens elements provide good correction for field curvature, distortion and lateral color aberrations.

2. The eyepiece according to claim 1 wherein x is 23.0mm, $ND_1$ is 1.523, $ND_2$ is 1.523, $ND_3$ is 1.786, $\gamma_1$ is 58.6, $\nu_2$ is 58.6 and $\nu_3$ is 25.5.

* * * * *